(12) United States Patent
Schnubel et al.

(10) Patent No.: US 12,454,001 B2
(45) Date of Patent: Oct. 28, 2025

(54) CASTING MOLD AND METHOD FOR PRODUCING A CASTING

(71) Applicant: Nemak, S.A.B. de C.V., Nuevo Leon (MX)

(72) Inventors: Dirk Schnubel, Saarbrücken (DE); Gerald Klaus, Saarbrücken (DE); Thomas Frederik Linke, Merzig (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 18/876,394

(22) PCT Filed: Jun. 22, 2023

(86) PCT No.: PCT/IB2023/056449
§ 371 (c)(1),
(2) Date: Dec. 18, 2024

(87) PCT Pub. No.: WO2023/248170
PCT Pub. Date: Dec. 28, 2023

(65) Prior Publication Data
US 2025/0269424 A1     Aug. 28, 2025

(30) Foreign Application Priority Data
Jun. 24, 2022   (LU) ........................... 502349

(51) Int. Cl.
*B22C 9/02*      (2006.01)
*B22C 9/08*      (2006.01)
(Continued)

(52) U.S. Cl.
CPC ............... *B22C 9/02* (2013.01); *B22C 9/086* (2013.01); *B22C 9/088* (2013.01); *B22C 9/103* (2013.01); *B22C 15/02* (2013.01); *B33Y 80/00* (2014.12)

(58) Field of Classification Search
CPC .... B22C 9/02; B22C 9/10; B22C 9/24; B22C 15/02
See application file for complete search history.

(56) References Cited

U.S. PATENT DOCUMENTS

| | | |
|---|---|---|
| 10,843,255 B2 | 11/2020 | Baranzke et al. |
| 2018/0221942 A1 | 8/2018 | Boyle et al. |
| 2023/0110424 A1 | 4/2023 | Kamichika |

FOREIGN PATENT DOCUMENTS

| | | | |
|---|---|---|---|
| CN | 105305704 A | | 2/2016 |
| CN | 105170916 B | * | 8/2017 |

(Continued)

OTHER PUBLICATIONS

Clarivate Analytics machine translation of CN 105305704 A (Year: 2016).*

(Continued)

*Primary Examiner* — Kevin E Yoon
(74) *Attorney, Agent, or Firm* — The Webb Law Firm

(57) ABSTRACT

A casting mould for producing a casting formed from a light metal alloy, in particular a housing for an electric drive for a motor vehicle. The casting mould advantageously has at least one sand core which is designed and arranged in the casting mould in such a way that the at least at least one sand core can be completely surrounded, at least in sections, in a circumferential direction by a light metal melt with which the casting mould is filled to form the casting. It is advantageous to be able to produce a casting in which, for example, a cooling channel is incorporated. It is not necessary to drill a hole to form a channel. Furthermore, the invention relates to a process for manufacturing a casting made of a light metal alloy, in particular a housing for an electric drive for a motor vehicle.

19 Claims, 9 Drawing Sheets

(51) Int. Cl.
 _B22C 9/10_ (2006.01)
 _B22C 15/02_ (2006.01)
 _B33Y 80/00_ (2015.01)

(56) References Cited

FOREIGN PATENT DOCUMENTS

| | | |
|---|---|---|
| CN | 107685143 A | 2/2018 |
| DE | 102013101942 B3 | 7/2014 |
| DE | 102018221826 A1 | 6/2019 |
| EP | 3600718 B1 | 9/2020 |
| EP | 3810357 B1 | 12/2021 |
| EP | 2945760 B1 | 1/2022 |
| WO | 2021157242 A1 | 8/2021 |

OTHER PUBLICATIONS

"Innovativer 3-D-Druck in Giessereien," Giesserei, 2014, vol. 101, No. 10, pp. 74-77.

\* cited by examiner

CASTING MOLD AND METHOD FOR PRODUCING A CASTING

CROSS-REFERENCE TO RELATED APPLICATIONS

This application is the United States national phase of International Application No. PCT/IB2023/056449 filed Jun. 22, 2023, and claims priority to Luxembourg Patent Application No. LU502349 filed Jun. 24, 2022, the disclosures of which are hereby incorporated by reference in their entireties.

BACKGROUND OF THE INVENTION

Field of the Invention

The invention relates to a casting mold for manufacturing a casting made of a light metal alloy, in particular a housing for an electric drive for a motor vehicle. The invention also relates to a method for manufacturing a casting made of a light metal alloy, in particular a housing for an electric drive for a motor vehicle.

Description of Related Art

Casting molds, sand cores and methods for manufacturing light metal castings are for example shown in EP 3 600 718 B1, EP 3 810 357 B1, EP 2 945 760 B1, CN 10 5 305 704 A, DE 10 2013 101942 B3, DE 10 2018 221826 A1 and WO 2021/157242 A1.

It is also known from the prior art that cooling channels, i.e. channels in a casting that conduct a coolant, which may comprise water, oil and/or a cooling fluid containing water, are drilled into the casting. Due to the process, such channels are exclusively straight, which unfortunately means that there is no freedom of design.

SUMMARY OF THE INVENTION

The object of the invention is to create a casting mold of the type mentioned at the beginning, by means of which a casting made of a light metal alloy can be produced, in which channels have already been incorporated.

Furthermore, the object of the invention is to create a casting mold for the production of a casting, in which there is a great deal of freedom in terms of design.

According to the invention, the problem is solved by the casting mold having at least one sand core that is formed and arranged in the casting mold in such a way that the at least one sand core can be completely surrounded, at least in sections, in a circumferential direction by a light metal melt with which the casting mold is filled to form the casting.

If the at least one sand core is completely surrounded in sections in the circumferential direction by the light metal melt, a channel is formed in the casting, the channel walls of which are formed by solidification of the light metal melt surrounding the at least one sand core, while a cavity is formed by the at least one sand core, which can be removed from the casting by mechanical or thermal treatment.

The at least one sand core can be elongated and/or bent, for example in a meandering or helical shape, and can have at least two end sections for forming a through-opening through which there is access to the channel in the casting to be produced. To this end, the end sections of the sand core can be connected to the casting mold or to another sand core, for example by means of a clamp connection, an adhesive connection and/or a plug-in connection.

It is conceivable that two connecting sections are provided that do not form end sections.

A channel in the casting formed in this way can be provided as a cooling channel when the casting is used for an electric drive, through which a cooling fluid such as oil, water and/or a cooling fluid comprising water is passed.

The fact that a casting mold according to the invention allows a great deal of freedom in the design of the casting means that a channel in the casting can be designed in such a way that it passes through the sand core, which can be completely surrounded by the light metal melt in the circumferential direction in sections in such a way that, for example, when the casting is used for an electric drive, a channel designed as a cooling channel is routed past those points at which a particularly high thermal load occurs when the electric drive is used in a motor vehicle. This is necessary, for example, in the area of a stator receptacle of an electric motor.

A casting mold according to the invention can be designed as a permanent mold, for example as an ingot mold, or as a sand casting mold.

In a permanent mold such as an ingot mold, outer casting mold walls made of a metal and reproducing the outer contours of a casting to be produced are formed, while inner casting mold areas reproducing inner contours are formed from sand cores.

A sand casting mold is a mold that, except for inserts such as cooling irons, is made entirely of sand and can be used once to produce a casting.

Preferably, a sand casting mold is self-supporting.

A casting mold according to the invention can be used for all casting processes in which a sand casting mold or a permanent mold is used, for example the so-called Core Package System (CPS) process with rollover or the so-called Rotacast process.

If a casting mold according to the invention is used as a permanent mold for carrying out a dynamic casting process in which the casting mold is moved during mold filling, a movement speed can be set during mold filling.

A movement speed can, for example, be a pivoting speed with which a tilt casting mold is rotated about a pivot axis during mold filling.

The advantage is an efficient casting process in which particularly fast mold filling is possible while avoiding turbulence during mold filling.

Use of the casting mold according to the invention in gravity casting or low-pressure casting is particularly preferred.

A method according to the invention for producing a casting formed from a light metal alloy is characterized in that at least one sand core arranged in a casting mold is surrounded, at least in sections, in a circumferential direction completely by the light metal melt, with which the casting mold is filled to form the casting. A casting method is created with which, for example, bent, elongated channels, which in turn may have branches, can be produced in a near final contour manner.

It is advantageous if the at least one sand core is bent, at least in some regions, wherein the ratio of the length of the sand core to the cross-section of the sand core is between 5 and 60, preferably between 7.5 and 38, and wherein the cross-section of the sand core is at least 1.6 mm.

The fact that the sand core is bent, at least in some areas, makes it possible to advantageously produce a casting having a channel whose channel geometry cannot be produced using a drilling method known from the prior art.

The length of the at least one sand core is the distance between a first end section of the sand core, at which the sand core is connected to the casting mold or to another sand core, and a second end section facing away from the first end section, with which the sand core is connected to the casting mold or to another sand core. This means that the length of the sand core corresponds to a length of the channel that the sand core represents, the length being determined by determining a distance from an entry opening to an exit opening of the channel along a profile centerline of the channel.

A sand core cross-sectional size, when considering a cross-section of a sand core, is the distance between two points on the sand core cross-section that are furthest apart.

If the sand core has a circular cross-sectional area, the sand core cross-sectional size is equal to the diameter.

If the sand core has an oval cross-sectional area, the sand core cross-sectional size corresponds to the larger of the two diameters.

The sand core cross-sectional size can be consistent over its length or have sections with different sand core cross-sectional sizes. If the sand core has regions with different sand core cross-sectional sizes, the smallest sand core cross-sectional size is to be used to form the ratio.

It is conceivable that a sand core cross-section size averaged over the length of the sand core is used to form the ratio.

A sand core cross-section can be round, circular, oval, polygonal or trapezoidal. Preferably, the sand core cross-section in the area that forms the channel is round, oval or square with rounded corners.

The inventors have determined that a sand core having a length-to-sand-core-cross-section size ratio according to the invention, with a sand-core cross-section size of at least 1.6 mm, is sufficiently stable to only slightly deform upon contact with a liquid light metal alloy. The advantage is that a casting mold is created with which castings can be produced that are close to the final contour. In addition, these castings have a channel with a channel length and shape that could not previously be produced.

A sand core cross-section size of at least 1.6 mm achieves particularly good cross-sectional stability when in contact with the melt.

The inventors have also established that such a sand core can be used with several different casting processes, for example in the so-called core package process with rollover, in permanent mold or even in die casting.

If the ratio of the sand core length to the sand core cross-section size of the sand core is between 5 and 60, a cooling channel can be created in a casting produced with a mold according to the invention, which enables particularly homogeneous cooling of the casting during its intended use, in particular as a housing for an electric drive. It is advantageous that material fatigue due to temperature change stress can be significantly reduced.

If the ratio of the sand core length to the sand core cross-section size of the sand core is between 7.5 and 38, very rapid cooling can occur in addition to particularly homogeneous cooling. Temperature peaks, which occur, for example, when a casting produced with a mold according to the invention is used as intended in an electric drive, can be reduced particularly quickly. Overheating of the electric drive can be advantageously prevented.

In one embodiment of the invention, the at least one sand core is elongated and preferably has supporting elements, by means of which the sand core is connected to the casting mold or to another sand core, wherein supporting elements that are adjacent in a longitudinal direction of the sand core are spaced apart from one another by between 60 mm and 200 mm, preferably between 90 mm and 150 mm, particularly preferably between 99 mm and 121 mm.

By using supporting elements, which may be formed for example from sand, a geometrically particularly complex and long channel can be produced in the casting. The supporting elements ensure that the at least one sand core, which is in direct contact with a light metal melt when the mold is filled, almost retains its shape and is only slightly deformed by the effect of heat. This makes it possible to produce a cast part with particularly low manufacturing tolerances that is close to the final contour.

If the at least one sand core is designed, for example, in a meandering or helical shape in some areas, the supporting elements can prevent the sand cores from collapsing when the mold is filled.

If supporting elements are used, an additional through-opening, which can be closed by a plug, is formed in each contact area in which the supporting elements rest against the at least one sand core, in a channel formed in the casting. The advantage of using supporting elements to support the at least one sand core and of using closing plugs is that a particularly long channel with a complex geometry or curved course can be produced in the casting.

The supporting elements are preferably integrally formed on the at least one sand core and are formed from molding sand.

The inventors have found that supporting elements spaced between 60 mm and 200 mm apart provide particularly good core stability when filling a casting mold according to the invention, in particular when the casting mold is used in gravity or low-pressure casting.

In a pressure casting process such as high pressure die casting (HPDC), despite the high mechanical load on the sand cores during mold filling, supporting elements spaced between 99 mm and 121 mm apart provide particularly good core shape stability.

In low-pressure casting processes with so-called rollover, it has proven effective to use supporting elements spaced between 90 mm and 150 mm apart.

Overall, a casting mold according to the invention is advantageously suited for use with a variety of different casting processes.

In a further embodiment of the invention, the at least one sand core has at least one connecting section which is designed to form a form-fitting, force-fitting and/or material-locking connection with the casting mold or another sand core, wherein alignment bevels and/or venting channels are preferably provided in the region of a transition from the at least one connecting section to the casting mold or the other sand core.

It is understood that the at least one connecting section can be designed as a supporting element or can act as such.

The alignment bevels enable particularly precise positioning of the at least one sand core, while the venting channels ensure that air or so-called core gas can escape from the at least one sand core, sections of which are completely surrounded by a light metal. It is advantageous that near-net-shape production of a casting is possible with simultaneously flawless casting quality.

The size of the venting channels is between 0.05 and 1.5 mm.

It is conceivable that the at least one sand core has several connecting sections that are designed to form a form-fitting, force-fitting and/or material-fitting connection with the casting mold or another sand core, wherein alignment bevels and/or venting channels are preferably provided in the area of a transition of the connecting sections to the casting mold or the other sand core.

In particular, the at least one sand core can have two connecting sections that are arranged at two ends of the at least one sand core, which can be elongated. This can be used, for example, to create a channel with an inlet opening and an outlet opening for a medium such as a coolant in a casting produced using the casting mold according to the invention.

If the sand core has exactly one connecting section, a channel like a blind hole can be created in a casting made with the casting mold according to the invention.

It is advantageous if the at least one sand core is 3D-printed and preferably has at least one cavity or comprises regions into which no binder has been introduced. A binder is formed in the manner of an adhesive and causes a plurality of sand grains to adhere to one another to form the at least one sand core. 3D printing, in which a sand core is produced layer by layer, makes it possible to produce sand cores with complex geometries, such as undercuts, that cannot be produced with core shooting machines. Cast sand cores also require a demoulding bevel to remove them from a core shooting machine tool. Sand cores with perpendicular walls can therefore be produced particularly well using 3D printing.

In addition, sand cores can be produced by 3D printing that have no draft angle, i.e. they are free of draft angles.

Usually, the binder content in a 3D-printed core is many times higher than in a cast core.

Because a binder in a sand core decomposes when it comes into contact with a light metal melt, forming what is known as core gas, binder-free areas are required, or at least a cavity into which the core gas can flow. It is advantageous to ensure that defects in the casting caused by core gas are not formed in the first place.

In the case of a 3D-printed core with at least one cavity, it is conceivable that this cavity is open to one side and an opening is covered by an adjacent sand core of the casting mold.

It is also conceivable that the at least one cavity can be vented through a vent channel, that is, core gas formed inside the casting mold can be vented through the cavity to the outside of the casting mold.

It is understood that an extraction device may be provided to extract the core gas from the casting mold.

In one embodiment of the invention, the casting mold comprises a further sand core that is 3D-printed and has a space that is designed to receive a cooling element.

By using a cooling element made of a metal, known as a cooling iron, the solidification of a light metal melt can be favorably influenced in the area of the cooling element, i.e. a fine-grained cast structure is formed in the area around the cooling element, which has particularly good mechanical properties. In addition, in particular in the case of aluminum-based melts, the formation of porosity in a casting in the area of the cooling element due to hydrogen outgassing is prevented. This so-called hydrogen porosity causes a leak, particularly in the case of thin-walled channels, when a liquid medium, such as a coolant, is passed through.

When using a casting mold according to the invention, cooling rates between 10 and 15 Kelvin per second are possible in an area located at a distance of between 3 and 5 mm from the cooling element in the casting to be produced, whereby the aforementioned properties can be achieved.

The inventors have recognized that a cooling rate in the aforementioned range between 10 and 15 Kelvin per second and the aforementioned distance from the cooling element are sufficiently large to achieve the required casting properties. Furthermore, it has been recognized that a higher cooling rate is not necessary, but rather a hindrance, as this can lead to the formation of cavities.

In a further embodiment of the invention, the casting mold comprises an additional sand core and/or a permanent mold insert element, wherein the additional sand core is formed as an electric motor core and the permanent mold insert element is formed as an electric motor permanent mold insert element, and is provided for forming a receiving space in the casting into which a stator and a rotor of an electric motor can be introduced.

A permanent mold insert element is an insert element that can be used multiple times, which, after a casting has been produced, can be reinserted into a casting mold to produce another casting. Such a permanent mold insert element can be used, for example, in die casting or another casting process in which permanent molds are used.

The electric motor core or the electric motor permanent mold insert element, which may be particularly rotationally symmetrical, can be arranged horizontally in the casting mold, for example, so that, for example in a gravity casting process, a molten metal does not rise in the longitudinal direction on it, but flows around the electric motor core or the electric motor permanent mold insert element in the circumferential direction.

The inventors have determined that a rise of the melt on the electric motor core or the electric motor permanent mold insert element in the longitudinal direction is not necessary to obtain a pore-free wall in the casting, defining a receiving space with cooling channels incorporated therein.

The casting mold according to the invention is suitable for manufacturing a housing for an electric drive for a motor vehicle, the electric motor of which is designed either as an internal rotor motor or as an external rotor motor.

It is expedient for the electric motor core to be designed in a multi-part manner, each electric motor core part having a demoulding bevel which extends in a longitudinal direction of the electric motor core, running around a circumferential surface of the electric and/or the electric motor permanent mold insert element has a demoulding bevel that extends in a longitudinal direction of the electric motor permanent mold insert element over a circumferential surface.

A demolding bevel is necessary for a closed sand core so that removal from a conventional two-part core shooting tool is possible. Depending on the complexity of the core, a demoulding bevel for a closed sand core is between 0.5 and 2 degrees. Preferably, the electric motor core is two-part and rotationally symmetrical, for example cone shaped or cylindrical, with each electric motor core part being rotationally symmetrical.

If the electric motor core is formed in two parts, the two electric motor core parts can be arranged one behind the other in the longitudinal direction of the core and can rest against one another in a contact plane, forming a flush transition to form the electric motor core. Each of the two electric motor core parts can be the same size in the longitudinal direction of the electric motor core. It is conceivable that the two electric motor core parts are of different sizes, in particular in the longitudinal direction of the electric motor core.

Each of the draft bevel of the electric motor core parts can either slope or rise from an outer end of the electric motor core part to the contact plane.

An electric motor core is created that has two draft bevels, each of which extends, for example, over half of the entire electric motor core. It is advantageous for the molding bevel to be reproduced in the casting produced with the casting mold according to the invention, which causes the receiving space for the stator and the rotor to deviate from a cylindrical shape, but only half as much as it would be with a one-piece core. This considerably reduces the effort required for mechanical processing to create a cylindrical receiving space for the stator and the rotor.

The same applies analogously to the electric motor permanent mold insert element, which, however, can be designed in one piece or, like the electric motor core, in several pieces.

The use of a casting mold according to the invention with such an electric motor core or an electric motor permanent mold insert element makes it possible to manufacture a casting close to the final contour.

It is understood that a further reduction in the amount of machining is possible by means of a three-, four- or five-part electric motor core or a similar electric motor permanent mold insert element.

It is conceivable that a lateral surface section of the electric motor core or the electric motor permanent mold insert element is formed by at least one cooling element.

In one embodiment of the invention, the mold is designed in such a way that a normal to a melt front of a light metal melt, with which the mold is filled against a direction of force of gravity, is arranged obliquely to a normal to a section of the mold in which the light metal melt comes into contact with the mold.

In gravity casting or low-pressure casting, when using a casting mold according to the invention, which can be designed as a permanent mold such as an ingot mold or as a sand casting mold, a melt front can rise in the casting mold against a direction of action of gravity, that is to say the normal to the melt front is arranged parallel and against the direction of force of gravity.

When the mold is filled with a melt, mold air is displaced by the melt and a mold cavity forming the casting to be produced is filled with the melt.

The fact that the normal to the melt front is oblique to a normal to an area of the casting mold in which the melt comes into contact with the casting mold, advantageously forms a sloping surface extending in a direction opposite to the direction of force of gravity, along which the molding air to be evacuated from the casting mold can be diverted. Defects in the cast part to be produced due to trapped molding air are advantageously prevented.

It is understood that the orientation of the two normals, one to the melt front and the other to an area of the mold, can be changed relative to each other by changing the alignment of the mold during filling in the Earth's gravitational field. This is not exclusively, but particularly necessary for a design of a so-called Rotacast process.

Such a design of the casting mold is particularly relevant in those casting mold areas in which reinforcing or cooling ribs are provided in the casting to be produced, that is, elongated and narrow recesses or cylindrical projections that are intended to hold screws for attaching add-on parts to a component that is produced from the casting.

In a further embodiment of the invention, the casting mold has an insert element that is designed to influence the flow properties of a light metal melt flowing into the casting mold, the insert element being designed in particular as a casting filter or as a casting filter cascade. The casting filter can be sponge-like and made of ceramic. The casting filter can have a porosity between 10 and 60 ppi (pores per inch), preferably between 25 and 55 ppi, particularly preferably between 40 ppi and 50 ppi.

By using a casting filter or a casting filter cascade, homogenization of a light metal melt flow can be achieved during mold filling of the casting mold, i.e. turbulence that can lead to casting defects such as oxide inclusions is advantageously prevented.

In one embodiment of the invention, the casting mold has an insert element that is intended to remain in a casting produced with the casting mold and is preferably designed as a component of the electric drive for which the casting can be used.

Such a component can, for example, be a heating coil that is cast into a wall of the casting and can be used to preheat the casting when it is used in an electric vehicle. Such a component can also be a reinforcing element, for example for a sand core or a bearing seat, which enables high mechanical stability and/or significantly better tribological behavior.

It is conceivable that insert elements are designed as sensors.

It is advantageous if the mold has an insert element formed from a material other than molding sand, which is intended to be removed from a casting produced with the mold. Such an insert element may be provided, for example, to form a channel with a particularly small cross-section of less than 6 mm, preferably between 1 and 4 mm.

The insert element can be hollow so that it can be completely removed from the casting.

In one embodiment of the invention, the casting mold has an area with several further sand cores, wherein the further sand cores are provided for mapping a receiving housing for power electronic components and/or transmission components of the electric drive when the casting is used for an electric drive of a motor vehicle.

In an electric drive, power electronics components are, for example, current transformers or inverters. The advantage is that a casting mold is created through which, for example, a housing for an electric drive can be produced, to which further component receiving chambers are integrally formed in one piece. The advantage is that a mounting step in which such a component receiving chamber is attached to the housing is not necessary.

The inventors have overcome the technical prejudice that individual components of an electric drive must be flanged to a housing and have found that it is advantageous to integrate them into a component receiving space that is integrally formed in one piece with the housing.

In a further embodiment of the invention, the mold has an area with several additional sand cores, wherein the several additional sand cores are provided for mapping cooling channels when the casting is used in an electric motor of a motor vehicle, through which a cooling fluid can flow in a controlled manner. Such an area can be integrated into the housing of an electric motor as part of the cast component to represent a thermal management system for controlling the cooling or heating system. The system makes it possible, for example in conjunction with a heat pump, to make use of the waste heat generated by the electric motor and power electronics where there is a demand, for example to heat the vehicle or to preheat or heat a traction battery. By introducing cooling channels into a casting, through which a cooling fluid can flow under the control of a control device, it is advantageously not necessary to relocate them when assembling an engine. Possible defects are prevented, engine assembly work is considerably reduced and the length of the lines and the associated weight are reduced.

In one embodiment of the invention, a cavity is formed in at least one side part of the casting mold, which forms an additional feeder, wherein the cavity is fluidically connected by through-channels to a mold cavity forming the casting. In the so-called gravity casting for solidifying a light metal melt with which a casting mold has been filled, the feeder is usually located above the casting and its feeder necks are only attached to the casting on an upper side of the casting. Although this makes it possible to feed the entire casting, large-volume casting areas, for example those with thin walls between 1 and 4 mm thick, which are fluidically connected to the feeder through these walls, cannot be sufficiently fed, making these casting areas particularly susceptible to shrinkage cavities.

By connecting an additional feeder to one side of the casting, castings with large dimensions and areas of low wall thickness can be produced without defects, in particular without cavities. It is understood that the additional feeder is fluidically connected to the feeder arranged above the casting, which acts as the main feeder, that is, a cavity in the casting mold that maps the main feeder and a cavity that maps the additional feeder are connected to one another by through-channels.

In particular, in the area of a receiving space for a stator and a rotor of the electric drive, a casting area can be fed below a thin wall that can delimit cooling channels introduced therein. Shrinkage holes that would lead to the rejection of the casting do not occur.

The mold advantageously includes vent means defining a vent passage and forming an inner mold wall section. The inner mold wall section defines a cavity that is filled with a melt to form a casting when the mold is filled.

A venting means can be particularly advantageous for permanent molds. The venting means can comprise venting nozzles that are arranged in particular at an end of a venting channel facing a casting mold cavity. The venting nozzles can, for example, have venting slits.

For example, particularly large venting channels can be created that allow sufficient venting of the casting mold even during rapid mold filling and do not require any deviation from a casting geometry to be formed, since the venting means forms a mold wall section.

BRIEF DESCRIPTION OF THE DRAWINGS

The invention will be explained in more detail below by means of examples and the accompanying drawings relating to the examples. The figures show.

DESCRIPTION OF THE INVENTION

Figure 1A:
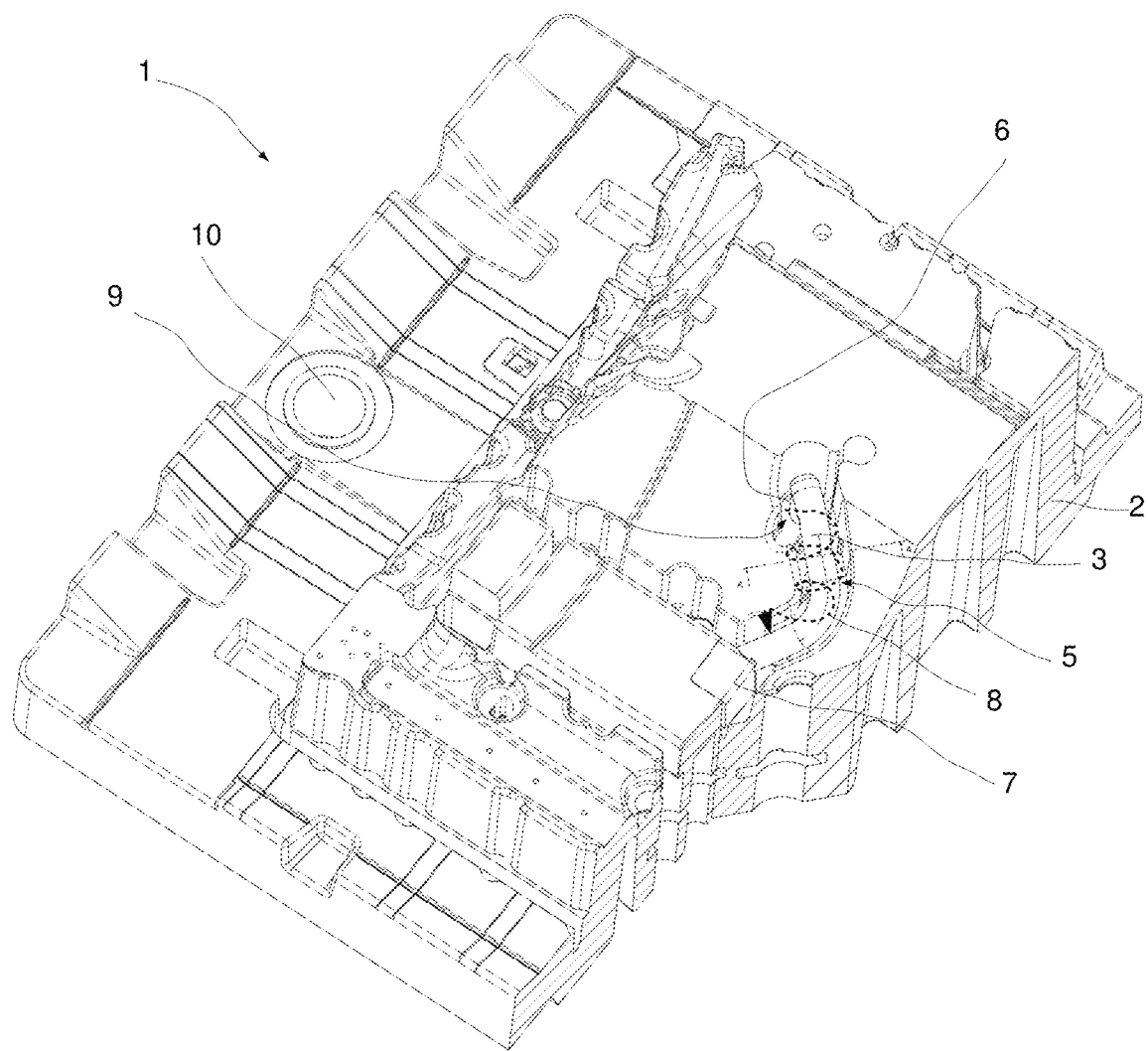
FIGS. 1a-c a first embodiment of a casting mold according to the invention for manufacturing a housing for an electric drive for a motor vehicle, FIGS. 2a-c a further embodiment of a casting mold according to the invention for manufacturing a housing for an electric drive for a motor vehicle, FIG. 3 a detail of an embodiment of a casting mold according to the invention for manufacturing a housing for an electric drive for a motor vehicle, FIG. 4 a further embodiment of a casting mold according to the invention for manufacturing a housing for an electric drive for a motor vehicle, FIGS. 5a-c an embodiment of a casting mold according to the invention for manufacturing a housing for an electric drive for a motor vehicle, FIGS. 6a-c a special embodiment of a casting mold according to the invention for manufacturing a housing for an electric drive for a motor vehicle.
Figure 1B:
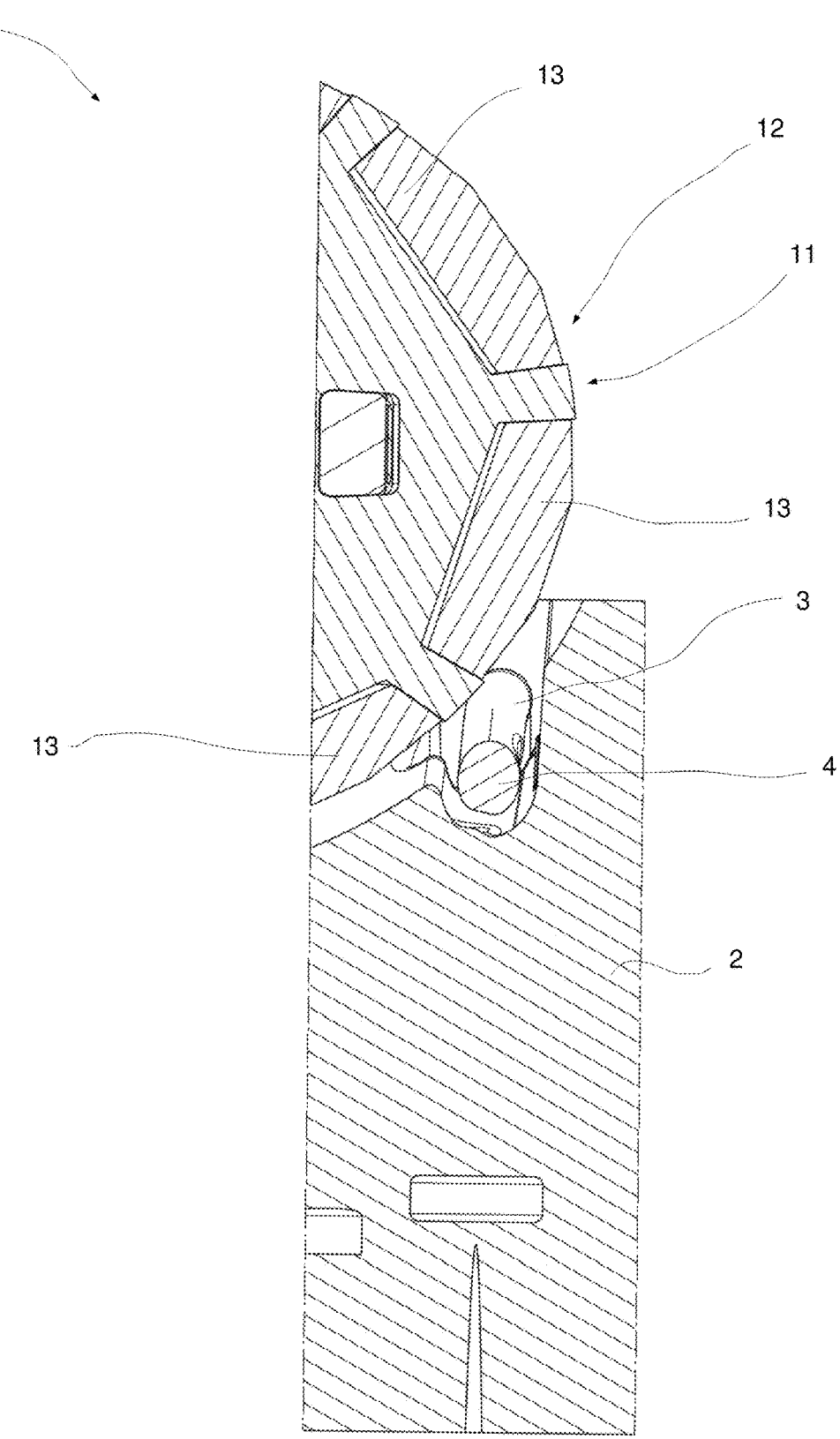

A sand casting mold 1, shown in FIG. 1a in a perspective plan view and in FIG. 1b in cross-section along a cut A-A from FIG. 1a in sections, with a base sand core 2, includes a bent sand core 3 with an oval cross-sectional area 4. The sand casting mold 1 is arranged in this embodiment in such a way that a section 5, which forms a channel and is arranged between two connecting sections 6, 7, can be completely surrounded by a light metal melt, with which the sand casting mold 1 can be filled to produce a casting (dotted helical arrow 8). Each of the connecting end sections 6, 7 is connected to the sand casting mold 1 by a plug connection, wherein, for example, a channel entry opening can be formed in the casting at a transition 9 of the connecting end section 6 to the base sand core 2.

The base sand core 2 also has a filling channel 10 through which a light metal melt can flow into the sand casting mold 1. It is conceivable that a casting filter, not shown in FIGS. 1a-c, is arranged in the filling channel 10 or in the area of the filling channel 10.

In this embodiment, the channel to be produced in a casting is represented by the bent sand core 3, wherein cavity forming channel walls is delimited in particular by an electric motor core 11, which is shown in part in cross-section in FIG. 1b and has been left out of FIG. 1a for reasons of clarity. The electric motor core 11 is essentially cylindrical in shape, with sections 12 of the lateral surface being formed by cast-iron cooling elements 13. The electric motor core 11 forms a cavity in the casting, in which a stator and a rotor of an electric drive, in particular, can be arranged.

Figure 1C:
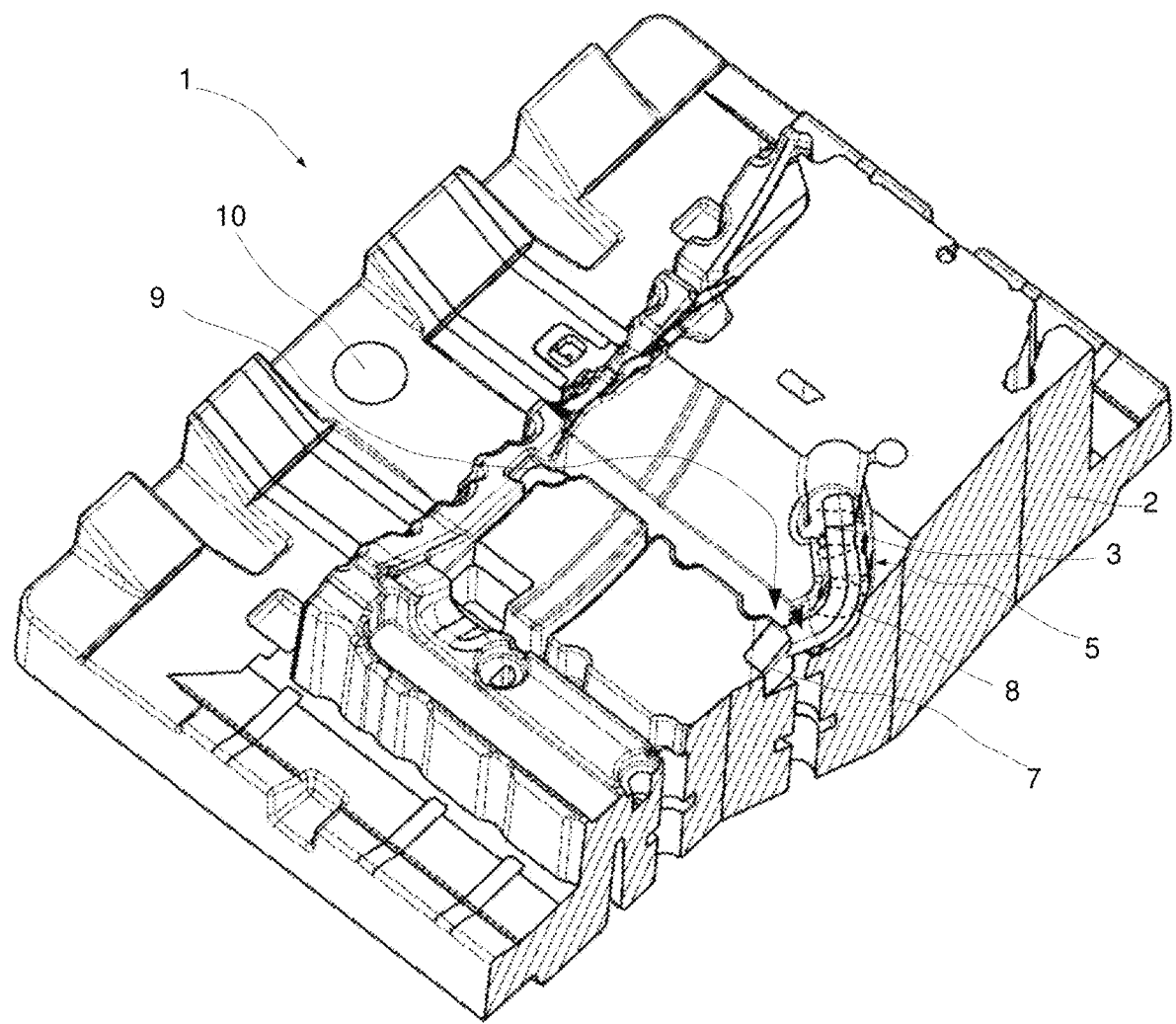

A sand core 3 shown in FIG. 1c in a perspective plan view differs from that shown in FIGS. 1a and 1b in that the sand core 3 has a single connecting section 7 and a free end not provided with a reference character in FIG. 1c.

A blind hole-like channel can be introduced into a casting produced with the casting mold 1 by means of the sand core 3 as shown in FIG. 1c.

Figure 2A:
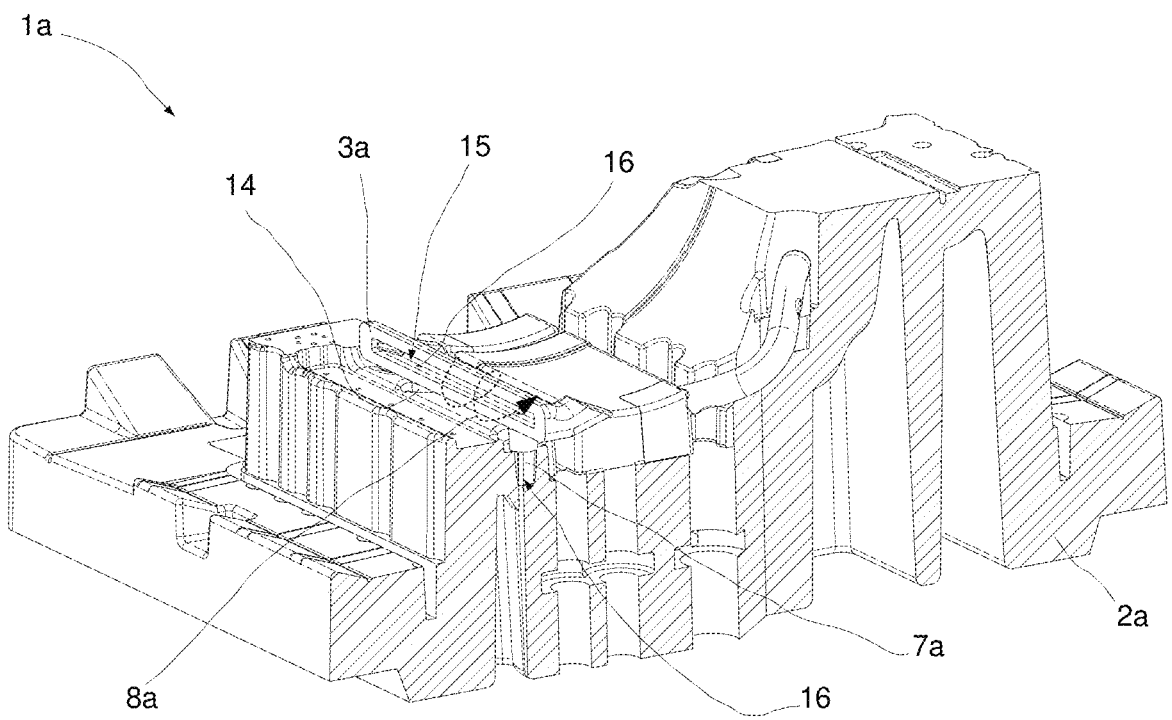
Figure 2B:
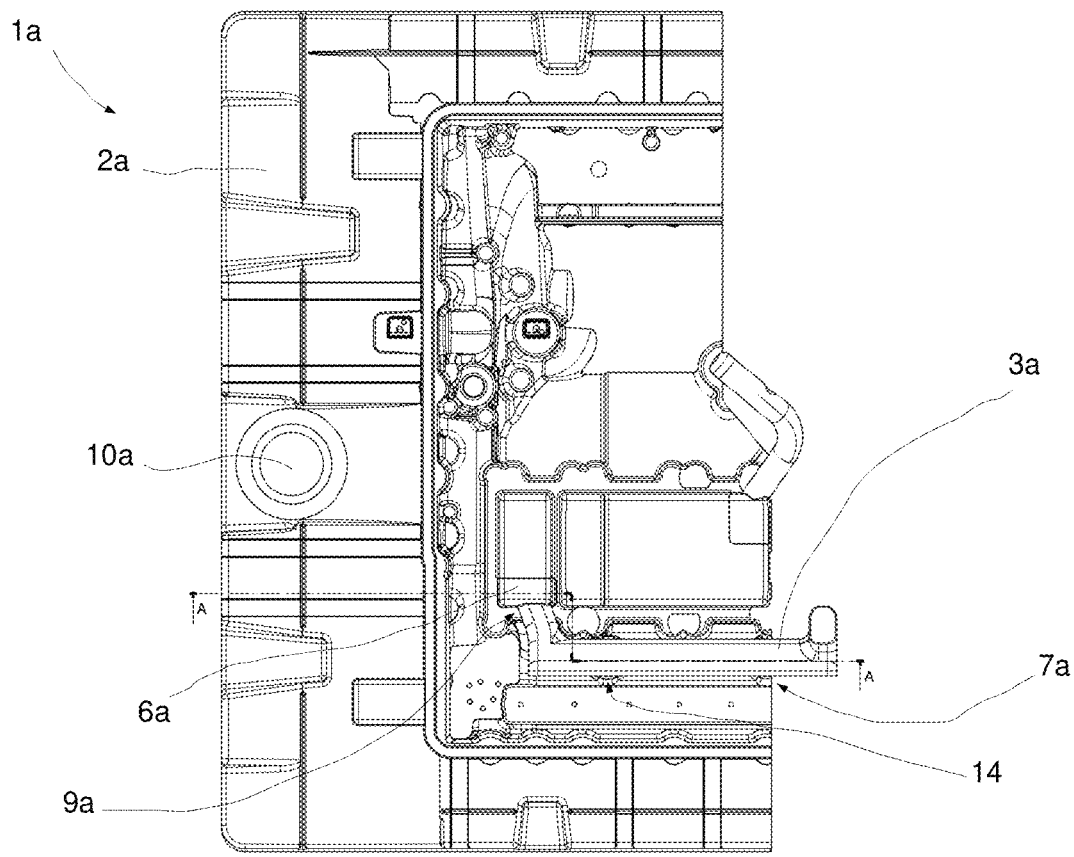
Figure 2C:
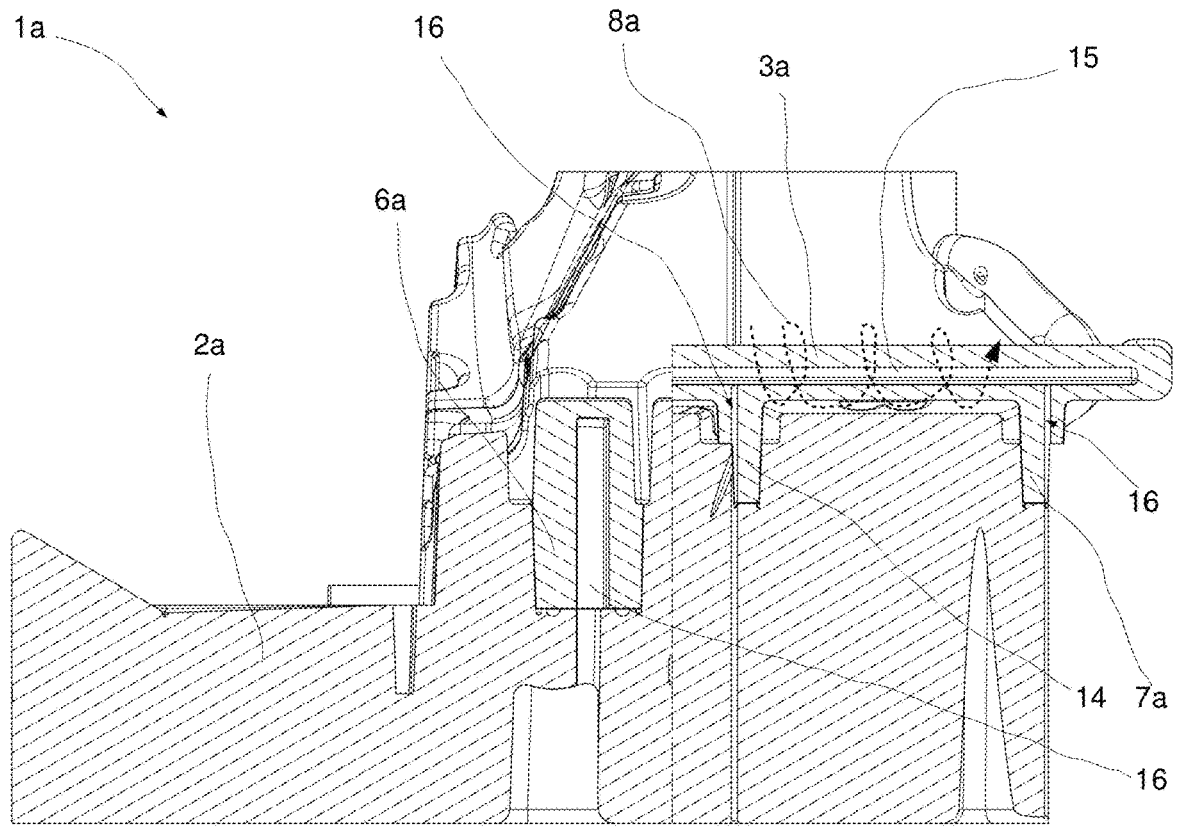

Reference is now made to FIGS. 2a-c, where identical or equivalent parts are designated by the same reference number as in FIGS. 1a-c, and the letter a is added to the reference number in each case.

A sand casting mold 1a, shown in part in FIG. 2a in a perspective view, in FIG. 2b in a plan view and in FIG. 2c in a sectional side view along the section A-A from FIG. 2b, mold 1a differs from that shown in FIGS. 1a-c in that a sand core 3a, which is horseshoe-shaped in plan view, has an additional supporting element 14, which is arranged between two connecting sections 6a, 7a. The supporting element 14 is formed from molding sand and is integrally formed on the sand core 3a.

In this embodiment, the sand core 3a, which is horseshoe-shaped in plan view, is 3D-printed and has a cavity 15 and venting channels 16, through which so-called core gas can be led out of the sand core 3a when the sand casting mold is filled with a light metal melt from the sand casting mold 1a. This can be particularly advantageous for those sand cores that have a high binder content and that are completely surrounded by the light metal melt in sections when a mold cavity is filled with a light metal melt.

Figure 3:
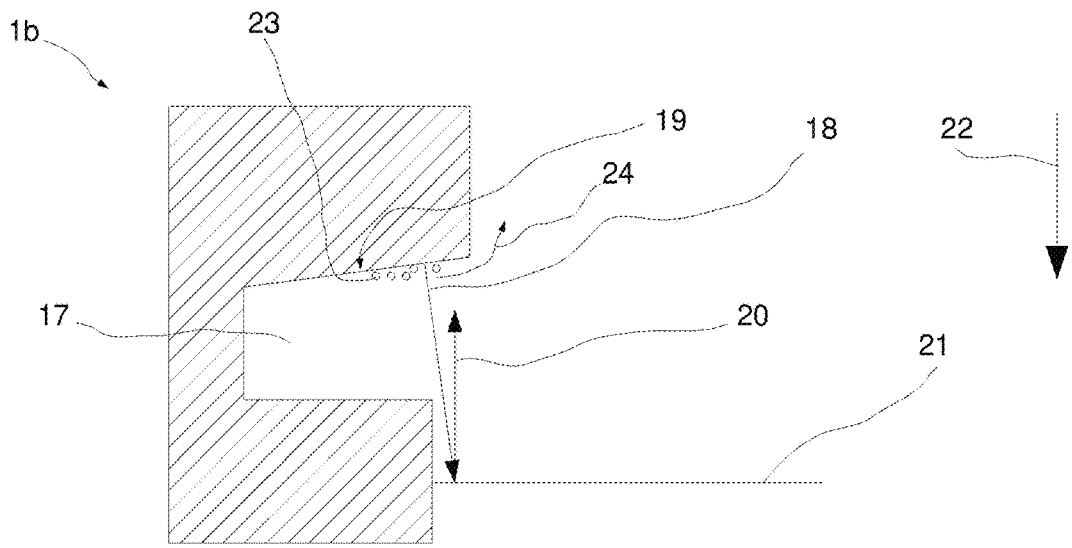

Reference is now made to FIG. 3, where identical or equivalent parts are designated by the same reference number as in FIGS. 1 and 2 and the letter b is added to the respective reference number.

A section of a sand casting mold 1b shown schematically in cross-section, includes a deep, narrow recess 17 in a side portion of the sand casting mold 1b, which is configured to represent a reinforcing rib of a casting that can be produced with the sand casting mold. A normal 18 to an upper sand mold wall section 19 in the area of the recess 17 is arranged obliquely to a normal 20 to a melt front 21 of a light metal melt, which, for a mold filling of the sand mold in this embodiment, rises against an effective direction 22 of the force of gravity in the sand mold 1b.

The sand casting mold wall section 19 forms an inclined plane along which mold air 23 displaced by the melt front 21 as it rises in the sand casting mold 1b can slide along an arrow 24. It is advantageous that no mold air is trapped in the recess, thus favorably preventing a casting defect leading to the rejection of the casting.

It is conceivable that a venting channel is passed through the sand casting mold wall section in order to lead molding air directly out of the sand casting mold 1b.

Figure 4:
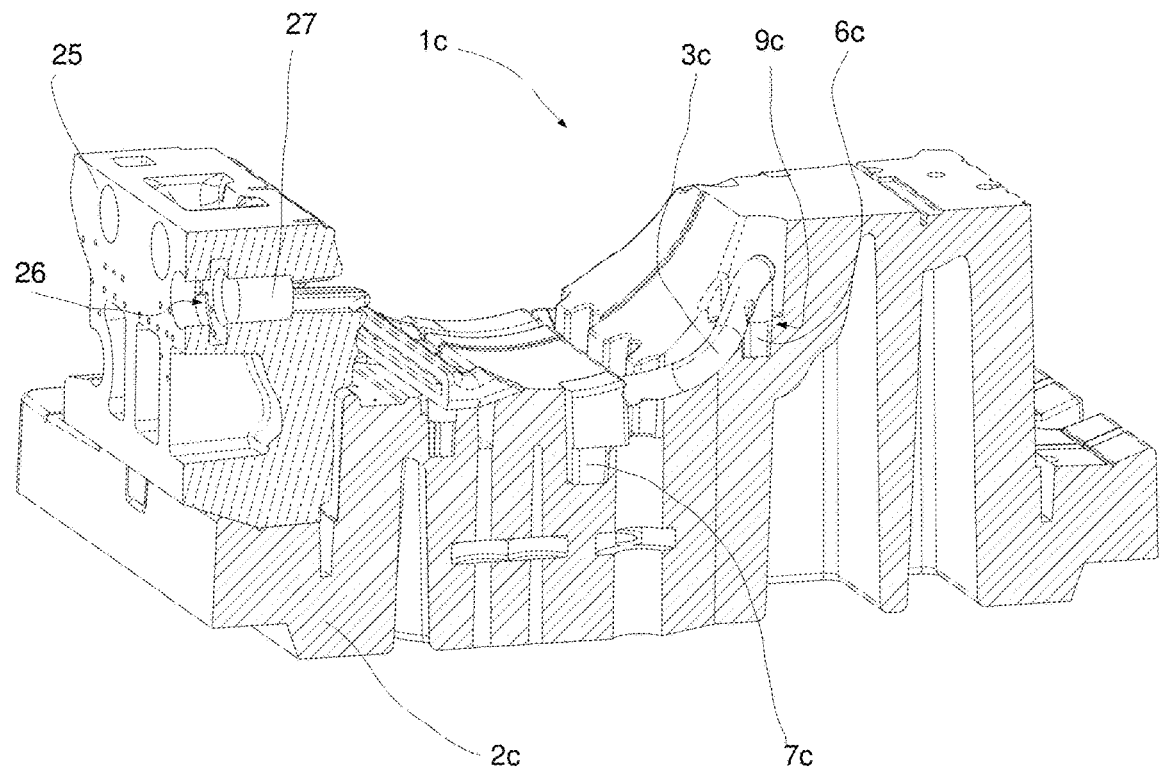

Reference is now made to FIG. 4, where identical or equivalent parts are designated by the same reference number as in FIGS. 1 to 3 and the letter c is added to the respective reference number.

In a sand mold 1c shown in a partial perspective view in FIG. 4, a side wall core 25 is 3D-printed and has a through channel 26 into which a cooling element 27 made of cast iron is inserted. Because the side wall core 25 is 3D-printed, the through channel can be formed in such a way that the cooling element 27 can be introduced into the side wall core 25 from outside the sand mold 1c and held in a force-locked manner.

Figure 5A:
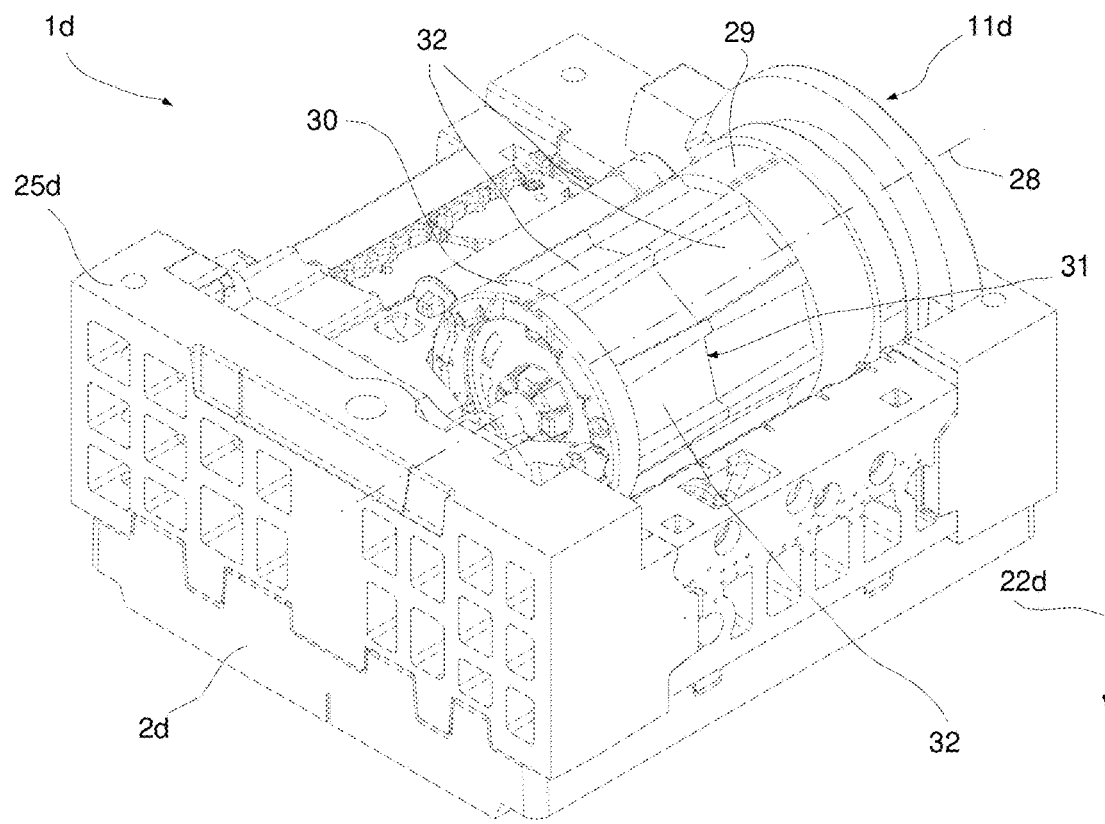
Figure 5B:
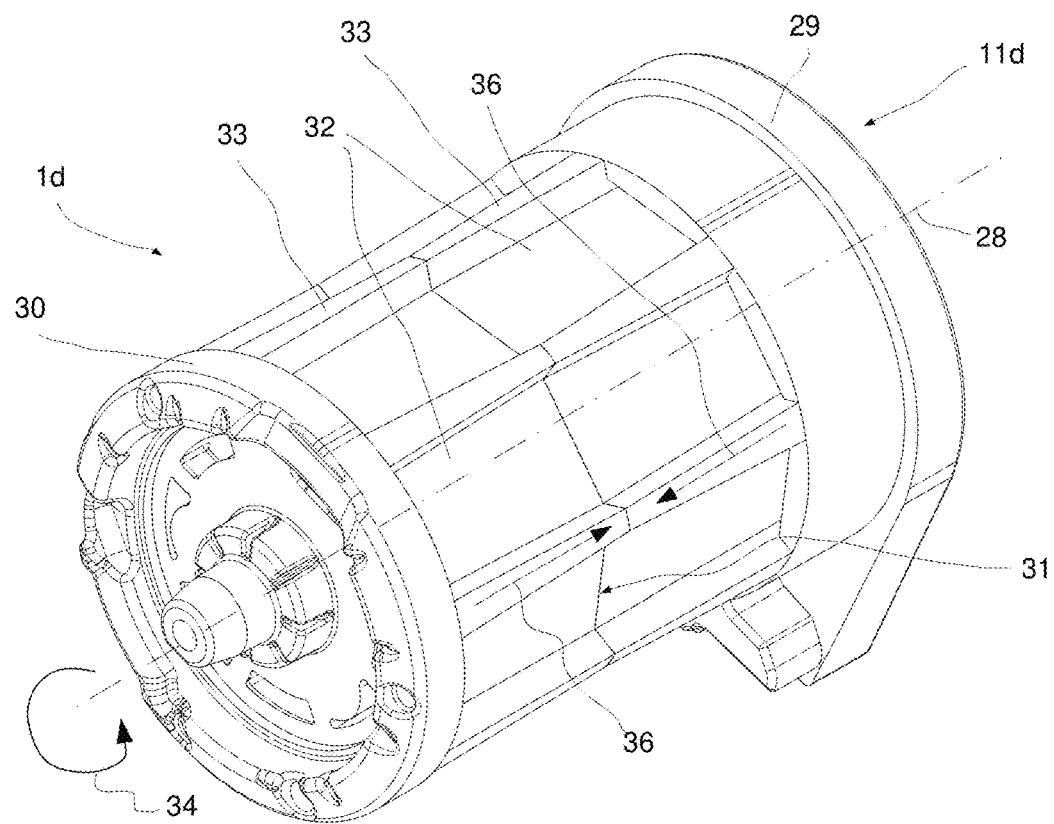
Figure 5C:
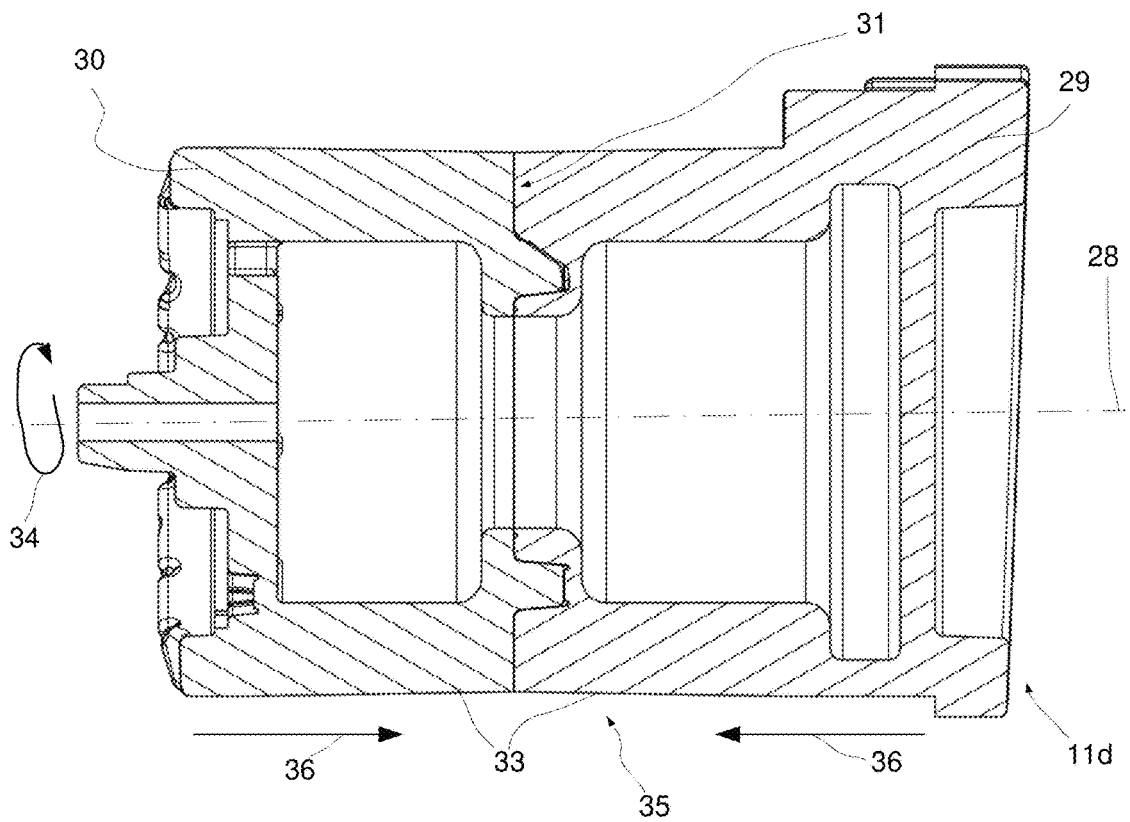

Reference is now made to FIGS. 5a-c, where identical or equivalent parts are designated by the same reference number as in FIGS. 1 to 4 and the letter d is added to the reference number in each case.

In a sand casting mold 1d shown in a partial view in FIG. 5a in a perspective plan view, a two-part electric motor core 11d is arranged horizontally in the sand casting mold 1d, whereby horizontal means that a light metal melt filling the sand filling the sand casting mold 1d, flows around the essentially cylindrical electric motor core 11d in the peripheral direction, for example, against a direction of action 22d of the force of gravity, and not in the longitudinal direction along a cylinder axis 28.

Two electric motor core parts 29, 30, which are connected to one another by a plug connection and rest against one another in a contact plane 31, form the electric motor core 11d and, in a 5b, the electric motor core 11d comprises recesses 32 that are provided to accommodate cooling elements designated in FIG. 1b with reference symbol 13.

Although it is conceivable that the electric motor core is 3D-printed, in this embodiment it is designed as a closed sand core.

Each electric motor core part 29, 30 has a demoulding bevel 33, which extends circumferentially in the circumferential direction 34 over a lateral surface 35 and slopes in the direction of an arrow 36.

Figure 6A:
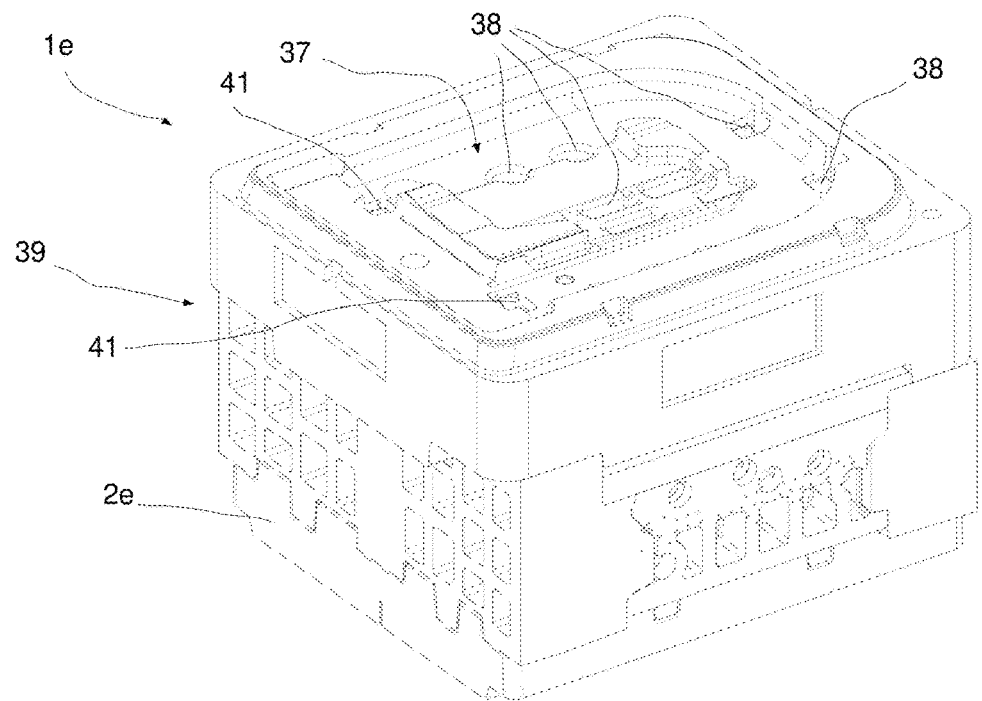
Figure 6B:
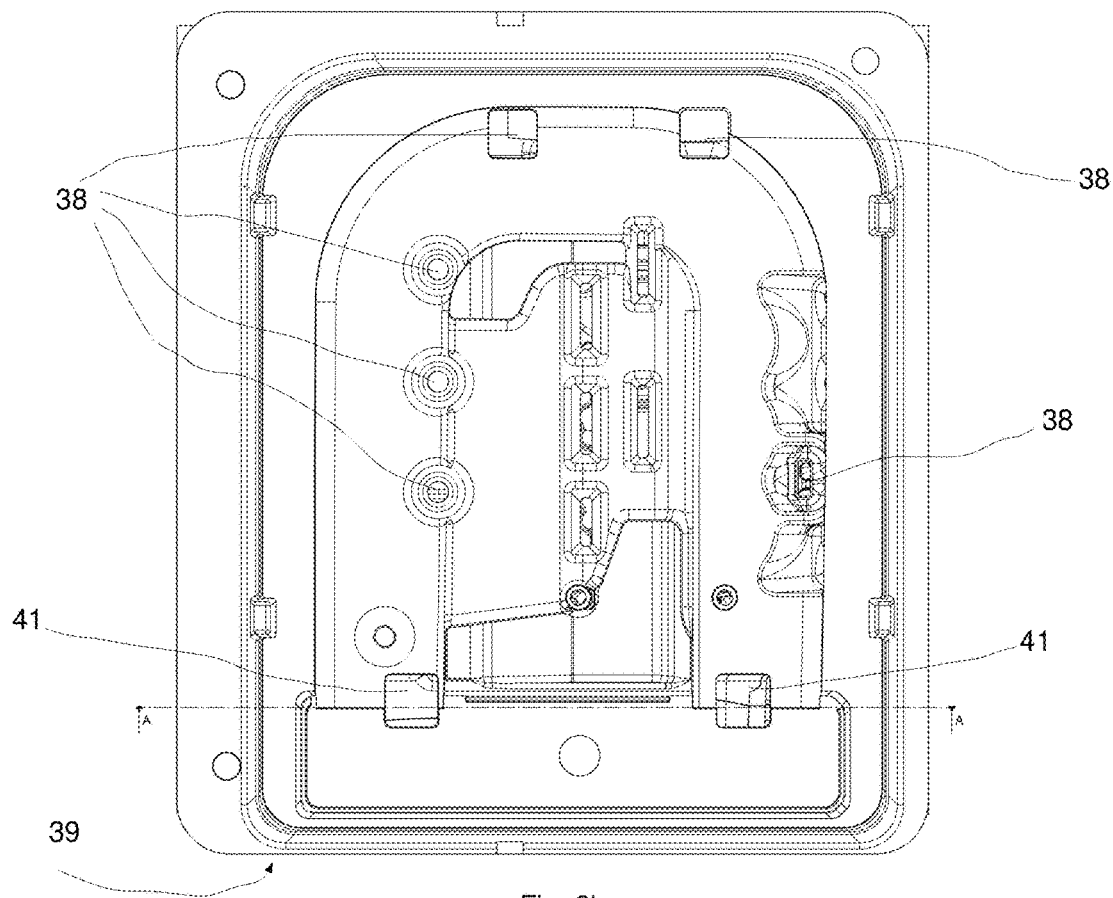
Figure 6C:
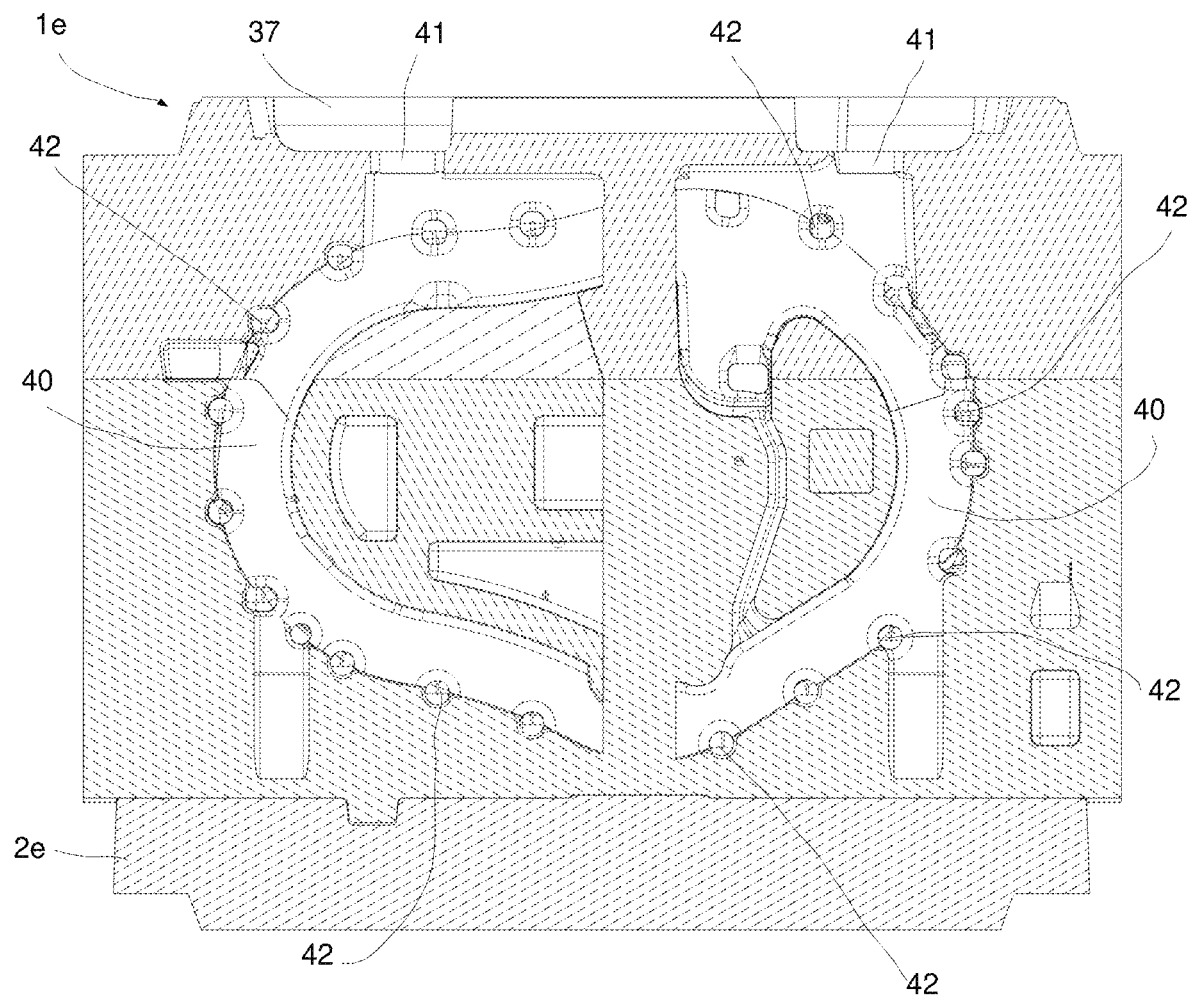

Reference is now made to FIGS. 6a-c, where the same or equivalent parts are designated by the same reference number as in FIGS. 1 to 5 and the letter e is added to the reference number in each case.

A sand casting mold 1e, shown in FIG. 6a in a perspective view, in FIG. 6b in a plan view and in FIG. 6c in a cut side view in section A-A from FIG. 6b, mold 1e comprises a cavity 37 which forms a main feeder of a casting that can be produced with the sand casting mold 1e and which, when the casting solidifies, is arranged above the casting. Through channels 38 provide a fluidic connection between the cavity 37 and a mold cavity, not shown in FIGS. 6a-c, which forms the casting.

A cavity 40 is incorporated into a multipart side wall core 39 of the sand casting mold 1e, which cavity reproduces an additional feeder attached laterally to the manufactured casting and is fluidically connected by a plurality of through channels 41 to the cavity 37 reproducing the main feeder.

A fluidic connection of the cavity 40, which represents the additional feeder, with the mold cavity, which represents the cast part, is ensured by through-channels 42. For reasons of clarity, not all through-channels 42 are provided with a reference sign.

It is conceivable that a casting mold (1-1e) is intended for manufacturing a housing for an electric drive and has an area with several further sand cores, which is set up to map a receiving housing for power electronics components and/or transmission components of an electric drive.

Furthermore, a casting mold (1-1e) can have a plurality of additional sand cores that are provided to map cooling channels when the casting is used in an electric motor of a motor vehicle, through which a cooling fluid flows in a controlled manner.

Furthermore, it is conceivable that a casting mold (1-1e) can have an insert element that is designed to remain in a casting produced with the casting mold. This can be, for example, a component of an electric drive for the production of which the casting is used.

It is understood that all possible combinations of features of the features shown in FIGS. 1a-c to 6a-c are conceivable. For example, a sand casting mold as shown in FIGS. 6a-c may have a recess 17 as shown in FIG. 3.

It is also understood that a casting mold according to the invention may be designed as a permanent casting mold. A permanent casting mold may, for example, be a chill mold or a die casting mold in which sand cores are inserted.

The invention claimed is:

1. A casting mold for producing a housing for an electric drive for a motor vehicle formed from a light metal alloy,
    wherein the casting mold has at least one sand core which is designed and arranged in the casting mold in such a way that the at least one sand core can be completely surrounded in a circumferential direction by a light metal melt with which the casting mold is filled to form the casting,
    wherein the at least one sand core is designed as a cooling channel core,
    wherein the at least one sand core is bent at least in some regions,
    wherein
    a ratio of a length of the sand core to a sand core cross-sectional size is between 7.5 and 38,
    the sand core cross-section size is the distance between two points of the sand core cross-section that are furthest apart,
    that the smallest sand core cross-sectional size in a sand core with regions with different sand core cross-sectional sizes is used to form the ratio, and
    the sand core cross-sectional size is at least 1.6 mm.

2. The casting mold according to claim 1,
    wherein the at least one sand core is elongated and has supporting elements by means of which the sand core is connected to the casting mold or to another sand core, wherein supporting elements adjacent in a longitudinal direction of the sand core are spaced apart from one another by between 60 mm and 200 mm.

3. The casting mold according to claim 2, wherein supporting elements adjacent in the longitudinal direction of the sand core are spaced apart from one another by between 90 mm and 150 mm.

4. The casting mold according to claim 2, wherein supporting elements adjacent in the longitudinal direction of the sand core are spaced apart from one another by between 99 mm and 121 mm.

5. The casting mold according to claim 1,
wherein the at least one sand core has at least one connecting section which is designed to form a form-fitting, force-fitting and/or material-locking connection with the casting mold or another sand core, wherein alignment bevels and/or venting channels are provided in the region of a transition from the at least one connecting section to the casting mold or the other sand core.

6. The casting mold according to claim 1,
wherein the at least one sand core is 3D-printed and has at least one cavity or comprises regions into which no binder is introduced.

7. The casting mold according to claim 1,
wherein casting mold comprises a further sand core which is 3D-printed and has a space which is designed to receive a cooling element.

8. The casting mold according to claim 1,
wherein the casting mold comprises an additional sand core and/or a permanent mold insert element, wherein the additional sand core is designed as an electric motor core and the permanent mold insert element is designed as an electric motor permanent mold insert element, and is provided to map a receiving space in the casting into which a stator and a rotor of an electric motor can be introduced.

9. The casting mold according to claim 8,
wherein the electric motor core is of a multi-part design, wherein each electric motor core part has a demoulding bevel which extends in a longitudinal direction of the electric motor core over a circumferential surface, and/or the electric motor permanent mold insert element has a demoulding bevel which extends in a longitudinal direction of the electric motor permanent mold insert element over a circumferential surface.

10. The casting mold according to claim 1,
wherein the casting mold has an insert element which is configured to influence the flow properties of a light-metal melt flowing into the casting mold, the insert element being designed in particular as a casting filter or as a casting filter cascade.

11. The casting mold according to claim 1,
wherein the casting mold has an insert element which is intended to remain in a casting produced by means of the casting mold and is designed as a component of the electric drive for which the casting can be used.

12. The casting mold according to claim 1,
wherein the casting mold has an insert element formed from a material other than foundry sand, which is provided for removal from a casting produced with the casting mold.

13. The casting mold according to claim 1,
wherein the casting mold has an area with a plurality of further sand cores, the further sand cores being provided for mapping a housing for power electronics components and/or transmission components of the electric drive when the casting is used for an electric drive of a motor vehicle.

14. The casting mold according to claim 1,
wherein the casting mold has an area with a plurality of additional sand cores, the plurality of additional sand cores being provided for mapping cooling channels through which a cooling fluid can flow in a controlled manner when the casting is used in an electric motor of a motor vehicle.

15. The casting mold according to claim 1,
wherein a cavity is formed in at least one side part of the casting mold, which forms an additional feeder, wherein the cavity is fluidically connected by through-channels to a mold cavity forming the casting.

16. A method for producing a housing for an electric drive for a motor vehicle with the casting mold according to claim 1,
wherein the at least one sand core arranged in the casting mold is completely surrounded, at least in sections, in a circumferential direction, by a light-metal melt, with which the casting mold is filled to form the casting.

17. The method according to claim 16,
wherein a channel bent in sections is formed in the casting through the sand core surrounded in sections in a circumferential direction by the light-metal melt.

18. The method according to claim 16,
wherein the light metal melt is cooled at a distance of 3 to 5 mm from a cooling element introduced into the casting mold at a cooling rate of at least 10 Kelvin per second, preferably at least 13 Kelvin per second, particularly preferably at least 15 Kelvin per second.

19. The method according to claim 16,
wherein a movement speed of a permanent mold that is moved during mold filling is adjustable.

* * * * *